United States Patent [19]
Bolliger

[11] 3,981,382
[45] Sept. 21, 1976

[54] SAFETY CLUTCH DEVICE

[75] Inventor: Edwin Bolliger, Morges, Switzerland

[73] Assignee: J. Bobst & Fils S.A., Switzerland

[22] Filed: May 21, 1975

[21] Appl. No.: 579,610

[30] Foreign Application Priority Data
May 28, 1974 Switzerland.......................... 7299/74

[52] U.S. Cl..................................... 192/150; 64/29
[51] Int. Cl.² ...................... F16D 7/04; F16D 43/20
[58] Field of Search................ 64/29; 192/56 R, 150

[56] References Cited
UNITED STATES PATENTS

| | | | |
|---|---|---|---|
| 1,126,219 | 1/1915 | Hupp | 64/29 |
| 1,910,125 | 5/1933 | Root | 64/29 X |
| 2,067,377 | 1/1937 | Burns et al. | 64/29 |
| 2,209,155 | 7/1940 | Fagg | 192/150 |
| 2,366,841 | 1/1945 | Dodge | 192/150 X |
| 2,643,530 | 6/1953 | Lathrop | 64/29 |
| 2,901,076 | 8/1959 | Dean | 192/150 |
| 3,050,598 | 8/1962 | Fennessy | 192/150 X |
| 3,063,263 | 11/1962 | Bobst et al. | 64/29 |

FOREIGN PATENTS OR APPLICATIONS

| | | | |
|---|---|---|---|
| 892,407 | 10/1953 | Germany | 192/56 R |

*Primary Examiner*—Allan D. Herrmann
*Attorney, Agent, or Firm*—Hill, Gross, Simpson, Van Santen, Steadman, Chiara & Simpson

[57] ABSTRACT

A clutch or coupling device for interconnecting a drive shaft to an axially aligned driven shaft which supports drive sprockets for chain belt conveyor of a press characterized by a disk member connected to the drive shaft for rotation therewith and having a plurality of recesses which have converging planar side walls and are circumferentially spaced on a circle coaxial with the axis of the drive shaft to receive circumferentially spaced dogs which have slanting plane surfaces extending substantially parallel to the side walls of the grooves and are mounted on a flange member which is connected by a mounting device to the driven shaft. The mounting device directly transfers rotational motion between the flange member to the driven shaft but enables relative axial movement of the flange member from a first position with the slanting plane surfaces of the dogs engaged with the side walls of the recesses to transfer torque between the shaft to a second position with the slanting plane surfaces withdrawn from engagement and includes a spring device for biasing the flange member to the first position. In operation, when an overload occurs, the increased torque acting on the engaged slanting surfaces of the dogs and recesses overcomes the force of the spring device and urges the flange member axially to the second position to disengage the coupling between the drive shaft and driven shaft.

10 Claims, 4 Drawing Figures

SAFETY CLUTCH DEVICE

BACKGROUND OF THE INVENTION

1. Field of the Invention

The present invention is directed to a safety coupling device between a drive shaft and an axial aligned driven shaft of a press which device will automatically disengage in response to an overloading torque being applied thereto.

2. Prior Art

In presses which operate on a workpiece such as a platen press which die cuts a sheet of paste board, the sheet of material is transferred from one station to another by a conveyor which utilizes a pair of endless chains carrying spaced gripper bars which chains are driven by a pair of sprocket wheels mounted on a shaft. To prevent damage to the conveyor due to jamming of the conveyor or portions of the press, an overload release coupling or clutch is provided between the drive shaft and the driven shaft of the conveyor which coupling will become disengaged at a predetermined amount of an overload torque to allow slippage to occur between the drive shaft and the driven shaft. An example of such an overload release coupling is disclosed in U.S. Pat. No. 3,063,263 which issued to Bobst et al on Nov. 13, 1962.

In the coupling disclosed in the Bobst et al patent, a disk is coupled to the drive shaft for rotation therewith and has a plurality of protrusions extending from both sides with the protrusions being on the circle which is concentric with the shaft. The housing connected to the driven shaft for rotation therewith encloses the disk and protrusions and has a plurality of cylinders receiving spring biased pistons or yieldable members which have surfaces for engaging each of the protrusions of the disk. When an overload occurs, the springs allow the pistons to move away from engagement with the protrusions, which are preferably balls carried by the disk, to allow slippage between the disk and the housing.

One of the shortcomings of the coupling disclosed in the Bobst et al patent is that contact errosion or wear occurs at the surfaces of the ball and the engaging surfaces of the pistons. Due to the pressure and friction acting on the surfaces of the pistons and the balls during transmission of torque between the disk and housing, contact wear cannot be avoided. A second problem or disadvantage with the clutch or coupling of the above mentioned Bobst patent is the provision of a plurality of cylinders with pistons engaging opposite sides of the protrusions on the disk involves accurate machining operations which increase the manufacturing costs for providing the clutch or coupling cylinders, pistons and individual springs.

SUMMARY OF THE INVENTION

The present invention is directed to a safety clutch or coupling device which transfers torque from a drive shaft to a driven shaft, and which is inexpensive to manufacture and minimize errosion or contact wear of the torque transferring surfaces. To accomplish these tasks, the safety coupling comprises a disk member having at least one slanting plane surface, a flange member having a slanting plane surface for each of the slanting plane surfaces of the disk member and extending substantially parallel thereto, a first means for coupling the disk member for rotation with one of the pair of shafts, preferably the drive shaft, and second means for connecting the flange member for rotation with the other of said pair of shafts, which is preferably the driven shaft, in axial alignment with the disk member, said second means including means enabling axial movement of the flange member from a first position with the slanting surfaces in torque transmitting engagement to a second position with the slanting surfaces withdrawn from engagement, and biasing means for applying a force to urge the flange member to the first position, said biasing means being adjustable to vary the force applied to the flange member so that the engaged slanting plane surfaces transfer torque between the pair of shafts until the amount of torque overcomes the force applied by the biasing means. Preferably, the slanting plane surfaces of one of the members such as the disk member are formed by side walls of circumferentially spaced grooves and the slanting surfaces on the other member, such as the flange member, are formed by slanting surfaces on dogs which are detachably attached at circumferentially spaced portions of the flange member. The means for enabling axial movement comprises a plurality of laminae which are thin and flexible members preferably arranged in a plurality of stacks with one end of the members of each stack attached to the flange member and the other end attached to a hub or housing which has a cavity which receives the flange member and the disk member. In addition to receiving the flange and disk member, the cavity of the housing also receives the biasing means which may be a spring device and the means for adjusting the pressure of this spring device. The coupling preferably includes means to actuate an external control element such as the switch in response to movement of the flange member to the second position which is a withdrawn position so that the source of rotation applied to the drive shaft can be stopped.

DESCRIPTION OF THE PREFERRED EMBODIMENT

Figure 1:
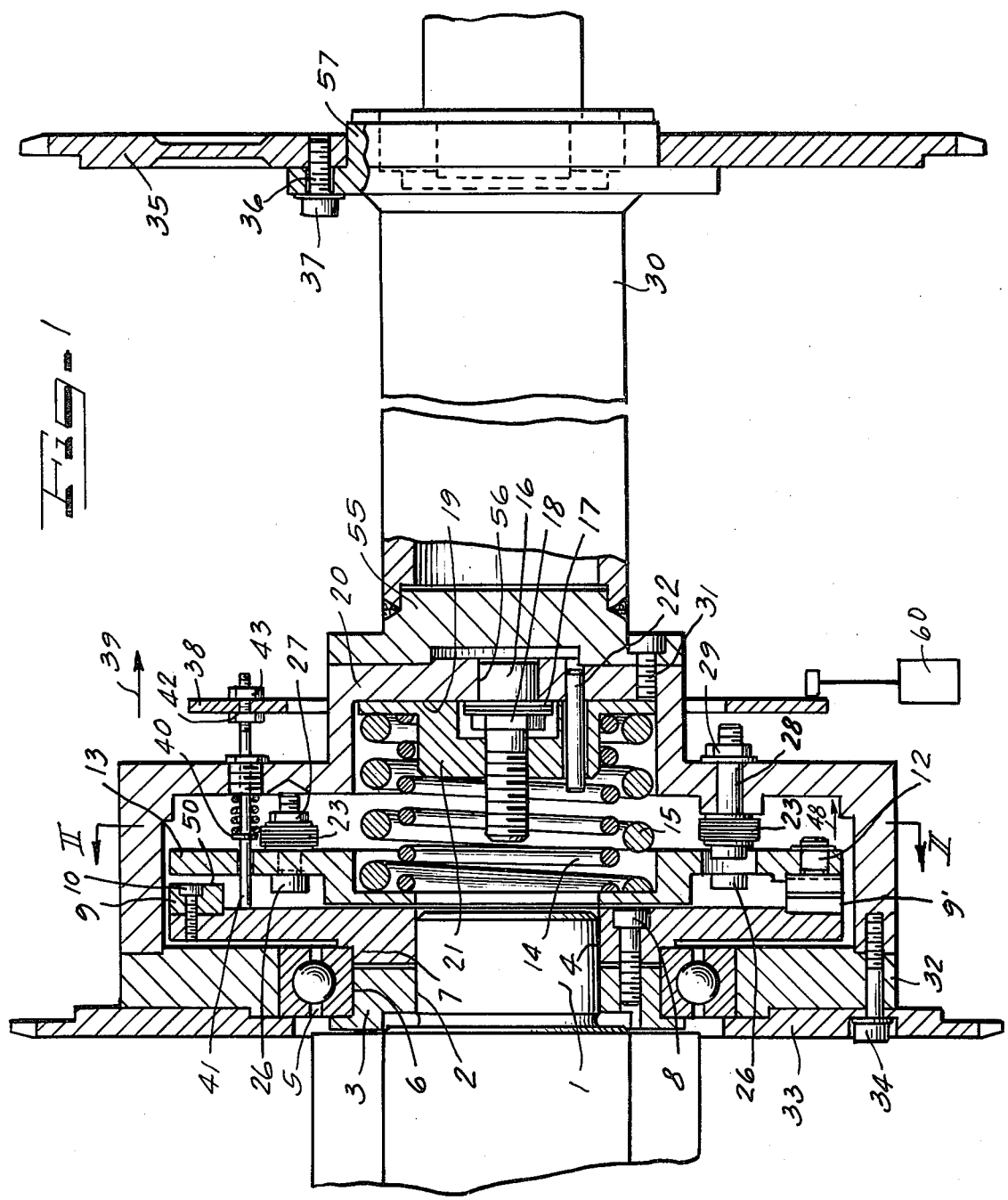
FIG. 1 is a partial cross-sectional view with some portions in elevation of the safety coupling of the present invention taken along lines II—II of FIG. 2.

The principles of the present invention are particularly useful when incorporated in a safety coupling or clutch device for interconnecting the drive shaft 1 to a driven shaft 30 as illustrated in FIG. 1. The drive shaft 1 has a cylindrical bearing surface 2 which receives a ring 3 and a disk 4 for rotation therewith. An inner race of a ball bearing 5 is supported and entrapped on a cylindrical surface 6 of the ring 3 and a cylindrical surface 7 of the disk 4 which is held in tight engagement with the ring 3 by fastening means such as screws 8. Thus, the disk 4 rotates with the drive shaft 1 and if desired, the disk 4 may be keyed to the shaft 1.

Figure 2:
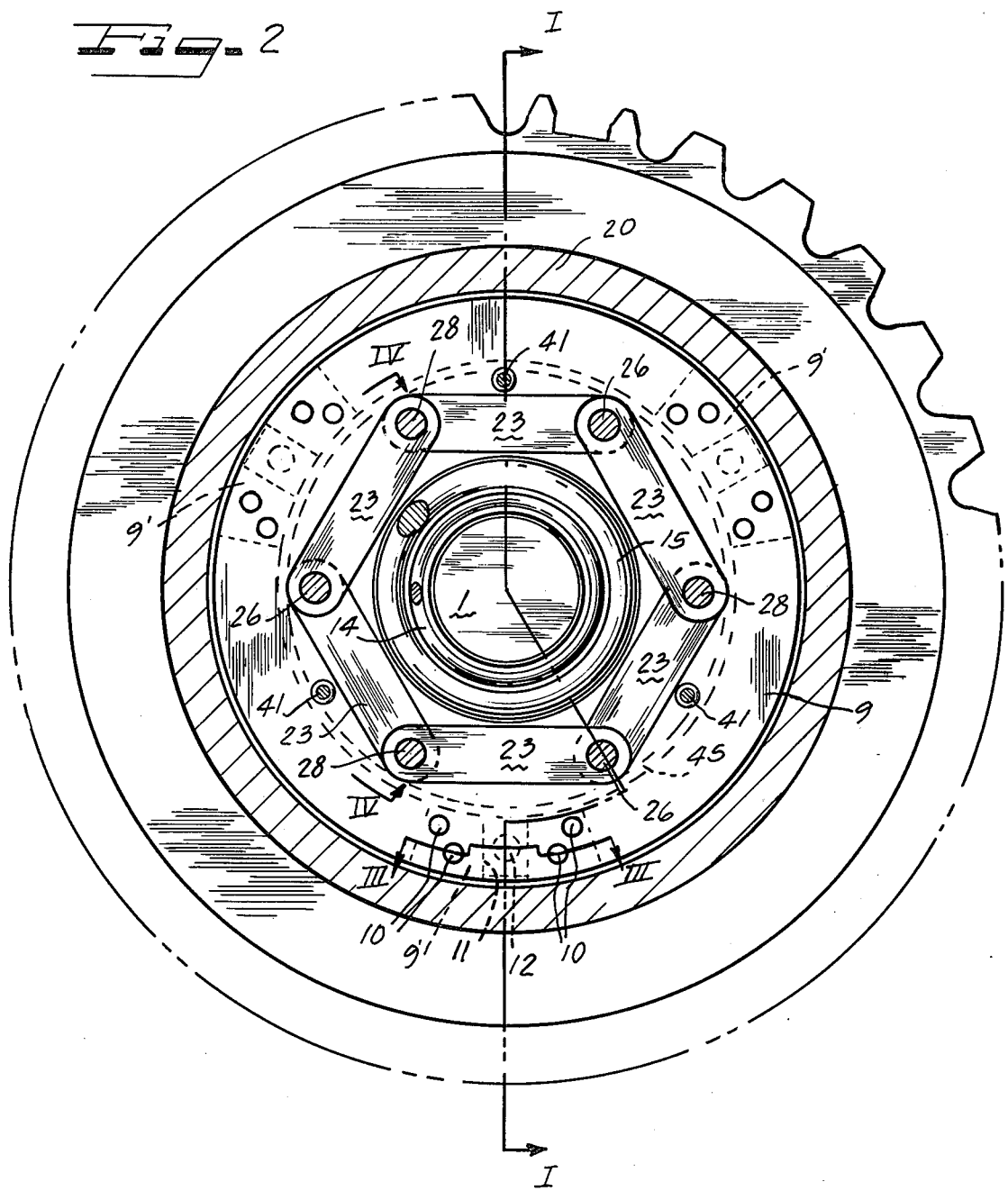
FIG. 2 is a cross-sectional view taken along lines II—II of FIG. 1.
Figure 3:
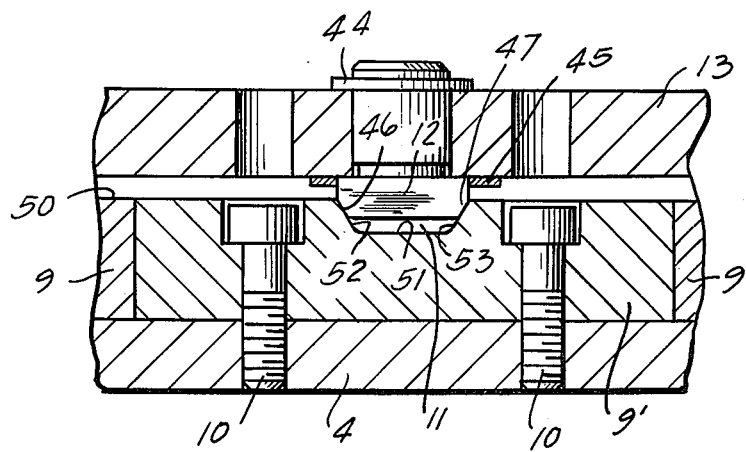
FIG. 3 is a partial cross-sectional view of the portions in elevation for purposes of illustration taken along lines III—III of FIG. 2.

The disk 4 is provided with a plurality of arcuate segments 9 and 9' which are detachably connected by screws 10 to provide a plane circular surface 50 which is substantially perpendicular to the axis of the shaft 1 and concentric therewith. Each of the segments 9' are provided with a groove 11 having a center line extending on a radius from the axis of the drive shaft 1. As illustrated in FIG. 2, three segments 9' are circumferentially spaced about the axis of shaft 1 so that the three grooves 11 are each circumferentially spaced about the disk and extend radially across the circular plane surface 50. As best illustrated in FIG. 3, the groove 11 has a V-shape with a bottom wall 51 extending between the apex of a pair of slanting side walls 52 and 53, which diverge from the bottom wall 51 to the surface 50. Thus, the side walls 52,53 form slanting plane surfaces which extend substantially radially from the axis of the shaft 1 and are slanting to the surface 50.

As illustrated in FIG. 1, the driven shaft 30 at one end has a member 55 on which a housing or hub 20 is detachably connected by a plurality of fastening means such as threaded fasteners 31. The housing 20 has a bell-shape providing a cavity which receives a flange member 13 which is coupled to the housing 20 by coupling means to be discussed hereinafter. The flange member 13 is provided with at least one dog 12 having a rectangular head. Preferably, the flange member 13 has three dogs for coacting with the three grooves 11 in the disk member 4. As best illustrated in FIG. 3, the head of each dog 12 has a pair of sloping or bevelled side surfaces 46 and 47 which form slanting planar surfaces for coacting with the slanting planar surfaces formed by the side walls 52 and 53 of the groove 11. The dog 12 is preferably provided with a cylindrical pin portion which is received in an aperture in the flange member 11 and held therein by a snap ring 44. To maintain the desired alignment of the head of the dog 12, a positioning means such as strips 45 are provided on a surface of the flange member 13 although the same function may be accomplished by providing a shoulder in the surface for engaging the edges of the dog.

Figure 4:
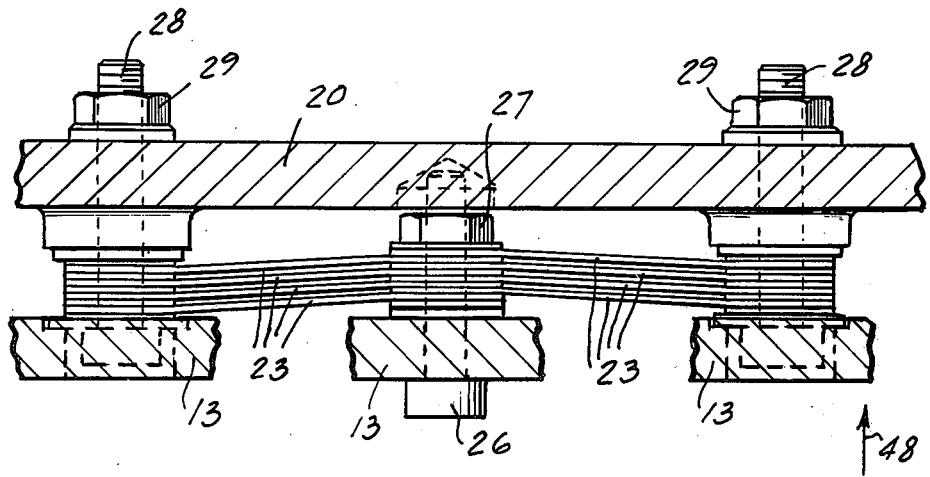
FIG. 4 is a partial cross-sectional view, which has portions in elevation for purposes of illustration, illustrating a deflected condition of the linkage as taken along line IV—IV of FIG. 2.

The coupling means between the flange member 13 and the housing 20 is best illustrated in FIGS. 2 and 4. The coupling means comprises a plurality of thin flexible laminae 23 which are arranged in stacks with one end of the laminae of each stack received on a bolt 26 and held against the flange member 13 by a nut 27 and the other end of the laminae of each stack received on bolts 28 which are held in tight engagement on the housing 20 by nuts 29. As illustrated, the ends of the laminae of two adjacent stacks are interweaved and attached by the single bolt and the bolts 26 and 28 are equally spaced so that six stacks interconnect the flange member 13 to the housing 20 to directly transfer rotational movement between the flange member 13 and the housing 20. Due to the flexible nature of the laminae 23, the flange member 13 may be shifted axially relative to the housing from a first position with the dogs 12 received in the grooves 11 to a second position such as illustrated in FIG. 4 with the dogs retracted from the grooves 11 to allow relative rotational movement or slippage between the disk 5 and the flange member 13.

The means for mounting the flange 13 to the driven shaft 30 includes biasing means for forcing the flange member 13 to the first position with the dogs 12 engaged in the grooves 11. The biasing means comprises a spring device having a pair of concentric springs 14 and 15 which are disposed in the cavity of the housing 20 entrapped between the flange member 13 and a spring retaining ring 21 which is adjustably positioned in the cavity. To adjustably position the spring retaining ring 21, a threaded member 16 having a plurality of washers 17 held against the head of the member 16 by a nut 18 is threaded into the ring 21. The head of the fastener 16 is received in an axially extending aperture 56 in a base or seating wall 19 of the housing 20. To prevent relative rotation of the spring retaining ring 21, a pin 22 is inserted in aligned aperture in the ring 21 and the housing 20. As illustrated, the washers 17 are abutted against a seating wall 19 of the housing and by movement of the threaded member 16, the axial position of the ring 21 can be changed relative to the wall or surface 19 to vary the compression of the spring device composed of the concentric springs 14 and 15.

The cavity of the housing 20 is partially closed by a ring 32 which engages the outer race of the ball bearing 5 and which may have a concentric shoulder to support a sprocket gear 33. The ring 32 and the sprocket gear 33 are detachably connected to the housing by a plurality of bolts such as 34.

The other end of the driven shaft 30 has a hub 57 having a surface for supporting the second or other sprocket gear 35. The sprocket gear 35 is attched to the hub 57 by a threaded fastener 37 extending through a slot 36 in the hub 57. The slot 36 enables angular adjustment of the teeth of the sprocket gear 35 to be in alignment with the teeth of the sprocket gear 33. The hub 57 is provided with surfaces for receiving a support bearing which is disposed on a support stub of the device such as the platen press to rotatably support the hub 57. Thus, the driven shaft 30 is supported at one end of the bearing 5 disposed on the drive shaft 1 and at the other end by a bearing supporting the hub 57.

Carried on the housing 20 is a means for indicating that the flange member 13 has been shifted to the second or withdrawn position. As illustrated, this means comprises at least one and preferably three pins 41 which are slidably received in fittings in the housing 20 and biased by springs acting on a shoulder 40 of the pin 41 so that the end is engaged on the disk member 4. Connected to the end of the pin 41 which extends out of the housing 20 is another member or disk 38 which is held on the pin 41 by a pair of nuts 42,43. As schematically illustrated, shifting of the disk 38 in the direction 39 will actuate a follower of a switch 60 which switch may be a control element for the power source rotating the drive shaft 1. For example, actuation of the switch 60 in response to movement of the disk 38 in the direction of arrow 39 can either switch off the main motor of the press or if a clutch is interposed between the output of the main motor and the drive shaft 1, cause disengagement of the clutch.

In operation, the springs 14 and 15 apply a pressure to the flange member 13 to move it to a first position with the dogs 12 engaged in the grooves 11. In this position, the slanting surfaces such as the surface 52 of the groove 11 is in torque transmitting engagement with the slanting surface 46 of the dog 12 to transmit torque from the drive shaft 1 to the driven shaft 30. Due to the direction of the slant of the surfaces 46 and 52, there is a component of the torque acting to cause movement of the flange member 13 in the direction 48 which movement is opposed by the force of the springs 14 and 15. If due to some jamming of the conveyor device, such as the chains driven by the sprocket gears 33 and 35 occurs an overload torque is created and the component force acting to move the flange member 13 in a direction 48 exceeds the force exerted by the springs 14 and 15 so that the flange member 13 will move axially to the second position withdrawing the dogs 12 from the grooves 11 to allow relative rotation between the disk member 4 and the flange member 13. As the flange member 13 moves to the second position, it engages the bead or shoulder 40 of the pin 41 to shift the plate 38 in the direction 39 to trip or actuate the switch 60 which stops the application of power to the drive shaft 1.

By properly adjusting the axial position of the spring retaining ring 21 in the housing 20 by use of the adjustment means including the threaded member 16, the force exerted by the pair of springs 14 and 15 can be adjusted to determine the maximum torque that can be transmitted before the flange member will be moved by the axial component created by the slanting surfaces such as 52 and 46 to the disengaged second position.

As mentioned hereinbefore, problems with contact wear between the torque transmitting surfaces such as 46 and 52 are minimized due to the use of larger contact surfaces for transmitting torque. Also, the coupling device of the present invention is less expensive to manufacture due to the reduction of the number of parts required particularly those that require close tolerances during machining and manufacturing.

Although various minor modifications may be suggested by those versed in the art, it should be understood that I wish to employ within the scope of the patent granted hereon all such modifications as reasonably and properly come within the scope of my contribution to the art.

I claim:

1. A safety coupling for transmitting torque between a pair of axially aligned shafts such as from a drive shaft to a driven shaft of a press, comprising a disk member having at least one slanting plane surface; a flange member having a slanting plane surface for each of the slanting plane surfaces of the disk member and extending substantially parallel thereto; first means for connecting the disk member for rotation with one of said pair of shafts; and second means for connecting the flange member for rotation with the other of said pair of shafts and in axial alignment with the disk member; said second means including means for enabling axial movement of the flange member from a first position with the slanting surfaces in torque transmitting engagement to a second position with the slanting surfaces withdrawn from engagement and biasing means for applying a force to urge the flange member to the first position, said means for enabling axial movement including a plurality of flexible link elements, said biasing means being adjustable to vary the force applied to the flange member so that the engaged slanting plane surfaces transfer torque between the pair of shafts until the amount of torque overcomes the force applied by the biasing means.

2. A safety coupling according to claim 1, wherein said first means connects the disk member to said drive shaft and the second means connects the flange member to said driven shaft.

3. A safety coupling according to claim 2, wherein the slanting plane surface of the disk member comprises a side wall of a V-shaped groove provided on a face of the disk member and wherein the slanting plane surfaces of the flange member comprises a slanting plane surface of a dog detachably connected to the flange member.

4. A safety coupling according to claim 1, which includes means for actuating a control element and being engaged by said flange member as it moves to said second position.

5. A safety coupling according to claim 1, wherein said slanting surfaces on each of said disk and flange members are substantially radially extending surfaces which are circumferentially spaced on their respective member.

6. A safety coupling according to claim 5, wherein the slanting surfaces on one of the members are side wall of circumferentially spaced grooves and wherein the slanting surfaces on the other members are bevelled surfaces on circumferentially spaced dogs attached to the other member.

7. A safety coupling according to claim 5, wherein the second means for connecting includes a housing having a cavity for receiving the adjustable biasing means and the flange and disk members, said flexible link elements being arranged in stacks with one end connected to the flange member and the other connected to the housing member, so that the flange member is directly coupled to the housing member.

8. A safety coupling for transmitting torque between a pair of axially aligned shafts such as from a drive shaft to a driven shaft of a press, comprising a disk member having at least one slanting plane surface; a flange member having a slanting plane surface for each of the slanting plane surfaces of the disk member and extending substantially parallel thereto; first means for connecting the disk member for rotation with the drive shaft; and second means for connecting the flange member for rotation with the driven shaft and in axial alignment with the disk member, said second means including means for enabling axial movement of the flange member from a first position with the slanting surfaces in torque transmitting engagement to a second position with the slanting surfaces withdrawn from engagement and biasing means for applying a force to urge the flange member to the first position, said means for enabling axial movement comprising a hub attached to the driven shaft, and superimposed laminae having one end attached to said flange and the other end attached to said hub, said biasing means being adjustable to vary the force applied to the flange member so that the engaged slanting plane surfaces transfer torque between the pair of shafts until the amount of torque overcomes the force applied by the biasing means.

9. A safety coupling for transmitting torque between a pair of axially aligned shafts such as from a drive shaft to a driven shaft of a press, comprising a disk member having at least one slanting plane surface; a flange member having a slanting plane surface for each of the slanting plane surfaces of the disk member and extending substantially parallel thereto, said slanting surfaces on each of said disk and flange members being substantially radially extending surfaces which are circumferentially spaced on their respective member; first means for connecting the disk member for rotation with one of said pair of shafts; and second means for connecting the flange member for rotation with the other of said pair of shafts and in axial alignment with the disk member; said second means including a housing having a cavity for receiving the flange and disk members, means for directly coupling the flange member to the housing, means for enabling axial movement of the flange member from a first position with the slanting surfaces in torque transmitting engagement to a second position with the slanting surfaces withdrawn from engagement and biasing means disposed in the cavity for applying a force to urge the flange member to the first position, said means for directly coupling comprising a plurality of thin flexible link elements, said elements being arranged in a plurality of superimposed stacks with one end of each stack connected to the flange member and the other end connected to the housing, said biasing means being adjustable to vary the force applied to the flange member so that the engaged slanting plane surfaces transfer torque between the pair of shafts until the amount of torque overcomes the force applied by the biasing means.

10. A safety coupling according to claim 9, which includes means for indicating movement of the flange member to the second position, said means including at least one pin slidably received in the housing and means biasing the pin to a first position, said pin being engaged by the flange member as the flange moves to the second position to shift the pin axially from the first position in the housing so that as the flange moves to the second position during an overload condition, said pin actuates a control device.

* * * * *